May 20, 1969   F. G. HUDDLE   3,444,884
ASSEMBLY UNITS
Filed Jan. 23, 1967

Francis Godfrey Huddle,
INVENTOR

BY Wenderoth, Lind and Ponack,
ATTORNEYS

United States Patent Office 3,444,884
Patented May 20, 1969

3,444,884
ASSEMBLY UNITS
Francis Godfrey Huddle, Purley, England, assignor to The Distillers Company Limited, Edinburgh, Scotland, a British company
Filed Jan. 23, 1967, Ser. No. 611,012
Claims priority, application Great Britain, Feb. 19, 1966, 7,403/66
Int. Cl. F16k 43/00, 51/00; F16l 55/18
U.S. Cl. 137—316                                    8 Claims

ABSTRACT OF THE DISCLOSURE

The invention relates to assembly units comprising a deformable sleeve having retained therein a plurality of components such as elements of ball or disc valves or disc filters the components assembled in positions relatively to each other which they are required to occupy in the unit, the undeformed sleeve having an elliptical or other such non-circular internal cross-sectional profile whose smallest width is less than the maximum cross-sectional width of the assembled components, the sleeve capable of being deformed so as to fit over the assembled components without extension of its internal perimetral dimensions and having sufficient elasticity when so fitted as to tend to regain its undeformed shape thus gripping and retaining the components.

---

The present invention is concerned with improvements in or relating to assembly units. By this term in this specification we mean a plurality of components which are held together by retaining means in the form in which they are to be used. Some examples of such units are ball or disc valves or disc filters. The assembled unit as a whole can then be inserted into and removed from the device in which it is to be used. Retaining means which have already been used include tubes, which may be elastic or non-elastic, and which may have on each end clips or nuts threaded into the tube to retain the components.

It is an object of the present invention to provide an improved assembly unit.

An assembly unit according to the present invention comprises a deforable sleeve within which are retained a plurality of components assembled in positions relatively to each other which they are required to occupy in the unit, the undeformed sleeve having an internal cross-sectional profile whose smallest width is less than the maximum cross-sectional width of the assembled components, the sleeve capable of being deformed so as to fit over the assembled components without extension of its internal perimetral dimension and having sufficient elasticity when so fitted as to tend to regain its undeformed shape thus gripping and retaining the components.

The internal surface of the sleeve can be smooth or have projections or corrugations to assist in gripping the components. The undeformed sleeve preferably has an elliptical internal cross-sectional profile. Suitable materials from which the sleeve can be made are high density polyethylene, plasticised P.V.C., polypropylene, nylon, rubber, spring steel, Phosphor bronze and titanium.

Most suitably the components have substantially similar maximum cross-sectional widths and are assembled end to end relatively to each other to form a single row along the longitudinal axis of the sleeve. They are preferably circular in cross section and shaped so that they form a cylinder when assembled end to end in the positions which they are required to occupy in the unit.

The preferred components are elements of ball or disc valves or disc filters.

The assembly unit can be readily assembled and taken apart and can be readily fitted as a unit into any device in which it may be used, thus facilitating cleaning operations.

An embodiment of the present invention is now described with reference to the drawings which represent a valve assembly unit which can be inserted as a unit into a pump.

Figure 1:
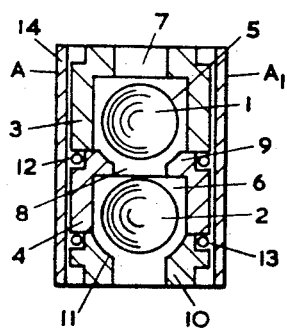
FIGURE 1 is a longitudinal section of a valve assembly unit showing a valve seat member and two cages, one of which is adapted to form a second valve seat member.
Figure 2:
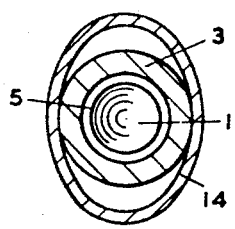
FIGURE 2 is a cross section through a line A–A$_1$ of the unit shown in FIGURE 1 showing the elliptical internal profile of the sleeve.
Figure 3:
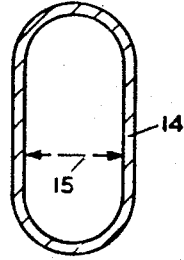
FIGURE 3 shows a sleeve in cross section when the unit is not assembled.

The assembly unit comprises two cage components 3 and 4 and valve component 10 each having a circular cross section and substantially similar external diameter. Components 3 and 4 each have a cylindrical bore 5 and 6 within which balls 1 and 2 are free to move longitudinally (some lateral motion is unsuitable) each bore having a constriction 7 and 8 at one end which retains the balls in the cage in one direction of movement but allows the free passage of fluid being pumped. Cage 4 has a valve seat 9 against which ball 1 can form a seal and which retains it in cage 3 in one direction of its movement. Valve component 10 has a valve seat 11 against which ball 2 can form a seal and which retains it in cage 4. Sealing rings 12 and 13 are present between the cage and valve seat components. The rings prevent fluid from leaking from the assembly. The components (cage and valve component) are assembled end to end so that the longitudinal axis of their bores are co-incident and housed as a unit in deformable sleeve 14 made of high density polyethylene. Sleeve 14 has an elliptical internal cross-sectional profile whose smallest width 15 (shown in FIGURE 3) is less than that of the diameter (maximum cross-sectional width) of the assembled components and whose internal perimeter is greater than the external circumference of any one of the components. As shown in FIGURE 1 and 2, where fitted over the components the sleeve has sufficient elasticity to grip and thereby retain them within itself.

The unit is formed by assembling the balls, cage, valve components and sealing rings in the position shown in FIGURES 1 and 2, deforming sleeve 14 so as to increase the dimension 15, fitting it over the components and then allowing it to tend to regain its non-deformed shape and grip the components.

I claim:

1. An assembly unit which comprises a deformable sleeve, a plurality of components assembled in positions relatively to each other which they are required to occupy in the unit retained within said sleeve, said sleeve undeformed having an internal cross-sectional profile whose smallest width is less than the maximum cross sectional width of said assembled components, said sleeve being capable of being deformed so as to fit over said assembled components without extension of its internal perimetral dimension and having sufficient elasticity when so fitted as to tend to regain its undeformed shape thus gripping and retaining said components.

2. An assembly unit as claimed in claim 1 wherein said deformable sleeve is made of high density polyethylene.

3. An assembly unit as claimed in claim 1 wherein said undeformed sleeve has an elliptical internal cross-sectional profile.

4. An assembly unit as claimed in claim 1, wherein all said components forming the assembly unit have substantially similar maximum cross sectional widths.

5. An assembly unit as claimed in claim 1 wherein said components are circular in cross section and form a cylinder when assembled end to end in positions relatively to each other which they are required to occupy in the unit.

6. An assembly unit as claimed in claim 1 wherein said components are elements of valves.

7. An assembly unit comprising a deformable sleeve, a plurality of valve elements retained within said sleeve, each element having a circular cross section, said elements assembled end to end in position relatively to each other to form a cylinder, said sleeve undeformed having an elliptical internal cross-sectional profile whose smallest width is less than the cross-sectional diameter of each of said elements, said sleeve being capable of being deformed to fit over said assembled elements without extension of its internal perimetral dimension and having sufficient elasticity when so fitted to tend to regain its undeformed shape thus gripping and retaining said elements.

8. In an assembly unit comprising a plurality of components having substantially similar cross-sectional shapes and being held together by retaining means in the form in which they are to be used, said retaining means comprising a deformed sleeve, said sleeve undeformed having an internal cross-sectional profile whose smallest width is less than the maximum cross-sectional width of the components, being capable of deformation without stretching so as to fit over the components, and having sufficient tendency to regain its undeformed shape to retain said components.

References Cited

UNITED STATES PATENTS

| | | | |
|---|---|---|---|
| 2,865,392 | 12/1958 | Russell | 137—315 X |
| 2,941,546 | 6/1960 | Cowherd | 137—315 X |
| 3,194,257 | 7/1965 | Stephens | 251—367 X |

WILLIAM S. BURDEN, *Primary Examiner.*